*(12)* United States Patent
Plotnikov

(10) Patent No.: US 7,705,829 B1
(45) Date of Patent: Apr. 27, 2010

(54) SYSTEM AND METHOD FOR PROVIDING COMPUTER INPUT

(75) Inventor: Igor Plotnikov, Sunnyvale, CA (US)

(73) Assignee: F5 Networks, Inc., Seattle, WA (US)

( * ) Notice: Subject to any disclaimer, the term of this patent is extended or adjusted under 35 U.S.C. 154(b) by 972 days.

(21) Appl. No.: 11/063,767

(22) Filed: Feb. 22, 2005

Related U.S. Application Data

(60) Provisional application No. 60/564,823, filed on Apr. 23, 2004.

(51) Int. Cl.
*G09G 5/00* (2006.01)

(52) U.S. Cl. .................. 345/168; 345/156; 341/22; 380/52

(58) Field of Classification Search ........... 345/156, 345/168–173; 341/22–26; 380/52
See application file for complete search history.

(56) References Cited

U.S. PATENT DOCUMENTS

| | | | |
|---|---|---|---|
| 5,724,027 A * | 3/1998 | Shipman et al. | 726/16 |
| 5,949,348 A * | 9/1999 | Kapp et al. | 340/5.4 |
| 2002/0105542 A1* | 8/2002 | Rosar | 345/741 |
| 2004/0257238 A1* | 12/2004 | De Jongh | 340/825 |

OTHER PUBLICATIONS

"Special Needs", pp. 1-2 can be found at http://www.virtual-keyboard.com/Special_Needs/special_needs.html.
"Touch Screens", pp. 1-2 can be found at http://www.virtual-keyboard.com/Touch_Screens/touch_screens.html.
"Developer", pp. 1-2 can be found at http://www.virtual-keyboard.com/Developer/developer.html.
"Onscreen Virtual Keyboard", pp. 1-3 can be found at http://www.virtual-keyboard.com.
"WiVik on-screen keyboard (virtual keyboard) software" available at http://www.wivik.com/index.html.
"Virtual Keyboard—Pre-Order" available at http://shop.store.yahoo.com/ibizpda/index.html.
"Click-N-Type virtual keyboard" pp. 1-3 and pp. 1-20 available at http://www.lakefolks.org/cnt/, May 13, 2005.

\* cited by examiner

*Primary Examiner*—Henry N Tran
*Assistant Examiner*—Christopher E Leiby
(74) *Attorney, Agent, or Firm*—Darby & Darby P.C.; John W. Branch

(57) ABSTRACT

A system and method are directed to managing text input. An image of a virtual keyboard is displayed to a user. The user enters text by using the virtual keyboard image and an input device, such as a pointing device. The image is repeatedly altered, such as by position, size, angle, or shape. One technique includes altering the image after each selection of a virtual key is made. One aspect of the invention includes determining sensitive input fields within a page and facilitating the use of the virtual keyboard for those fields. The invention can be used to improve security when the possibility of keyboard sniffers exists.

27 Claims, 9 Drawing Sheets

SYSTEM AND METHOD FOR PROVIDING COMPUTER INPUT

CROSS-REFERENCE TO RELATED APPLICATIONS

This application claims the benefit of U.S. Provisional Application Ser. No. 60/564,823 filed on Apr. 23, 2004, the benefit of the earlier filing date of which is hereby claimed under 35 U.S.C. §119 (e) and further incorporated by reference.

FIELD OF THE INVENTION

The present invention relates to computer input/output and, more particularly, to a system and method for improving entering of text and commands to a computer.

BACKGROUND OF THE INVENTION

Computers employ a variety of mechanisms for allowing a user to enter text and commands. A standard keyboard is one such mechanism. A pointing device, such as a mouse, can also be used to enter computer input. A "sniffers" is software, hardware, or a combination thereof that can be used to detect what is being entered via a computer keyboard. In some situations, a sniffer can present a security problem, where a user does not want a third party to detect what the user is entering via the keyboard or other input device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise.

The phrase "in one embodiment" as used herein does not necessarily refer to the same embodiment, though it may.

As used herein, the term "or" is an inclusive "or" operator, and is equivalent to the term "and/or", unless the context clearly dictates otherwise.

The term "based on" is not exclusive and allows for being based on additional factors not described, unless the context clearly dictates otherwise.

Throughout the specification, the meaning of "a," "an," and "the" include plural references. The meaning of "in" includes "in" and "on."

Briefly stated, the present invention is directed to a system, apparatus, and method for receiving user input to a computer, by displaying a series of changing keyboard images, such that the meaning of raw data entered by a user varies. The keyboard image is used to interpret the raw user input. By changing the images, the interpretation of the raw input is altered. In one embodiment, an image of a keyboard is displayed, and a user employs a pointing device to select keys on the keyboard. As the position of the keyboard is altered, the correspondence between a screen coordinate and a virtual key is correspondingly altered.

Figure 1:
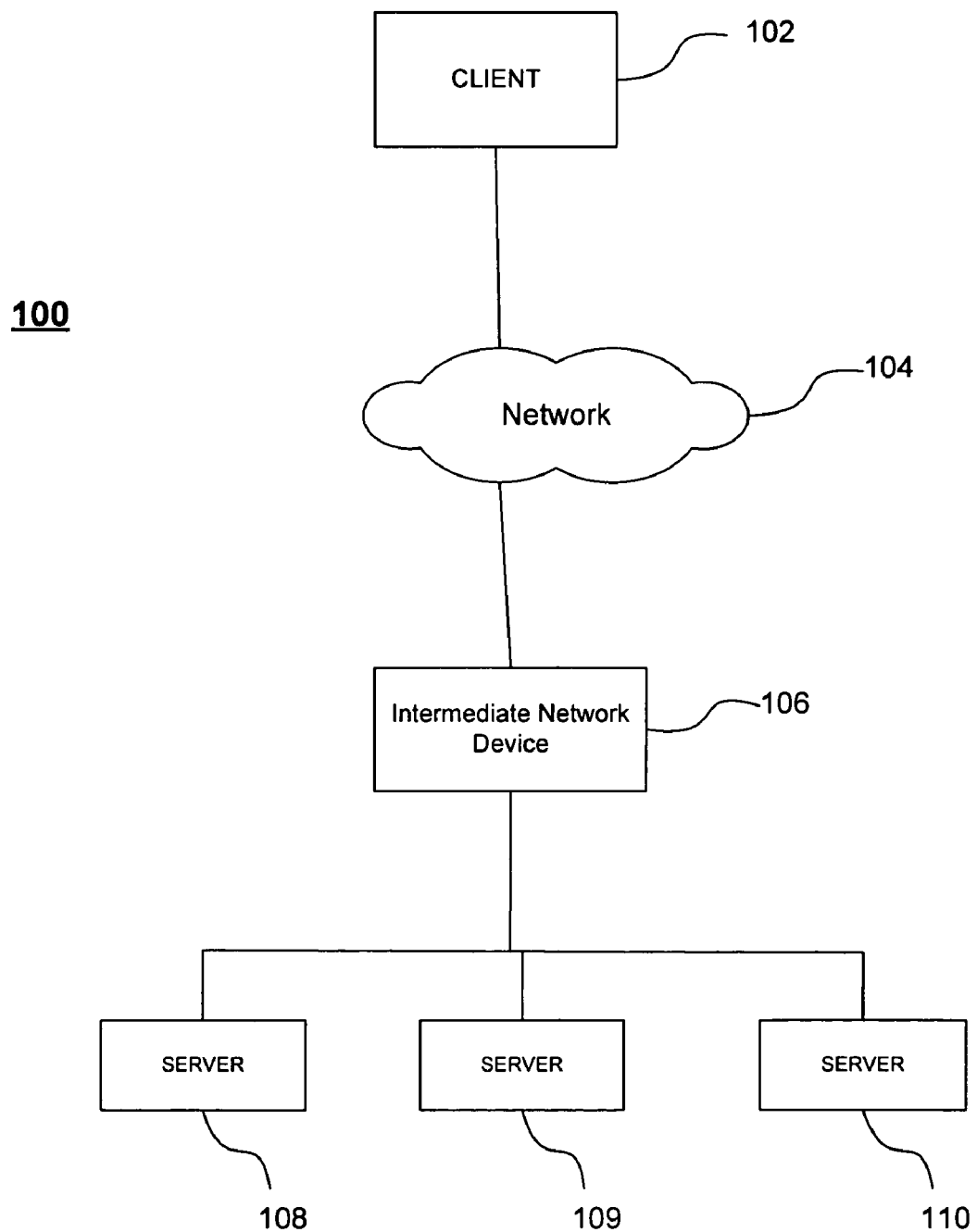
FIG. 1 is a system diagram of a computer network in which the invention may be practiced.

FIG. 1 illustrates an exemplary environment 100 in which the invention operates, according to one embodiment of the invention. The environment 100 includes a network 104. The network 104 can be a wide area network (WAN), a local area network (LAN), or a combination of interconnected WANs and LANs. The Internet is made up of a vast number of such interconnected networks, computers, and network devices that use the Transmission Control Protocol/Internet Protocol ("TCP/IP") suite of protocols to communicate with one another. The environment further includes one or more client devices, such as client 102 (also referred to as clients), an intermediate network device 106, and one or more servers 108-110. The invention can be practiced in an environment with one server or numerous servers. Network 104 couples client 102 to the servers 108-110 through the intermediate network device 106. The intermediate device 106 can be a router, a traffic manager, a firewall, a Virtual Private Network device, a combination of any of these devices, or another network device. The Big-IP® family of traffic managers and the FirePass VPN device, by F5 Networks of Seattle, Wash., are examples of traffic managers and a VPN device, respectively, that can be the intermediate device 106.

Client 102 is a computing device capable of connecting with network 104. The set of such devices can include devices that connect using one or more wired communications mediums, a wireless communications medium, or a combination of wired and wireless communications mediums. Client 102 can be such devices as personal computers, multiprocessor systems, microprocessor-based or programmable consumer electronics, network PCs, cell phones, smart phones, pagers, PDAs, Pocket PCs, wearable computers, walkie talkies, radio frequency (RF) devices, infrared (IR) devices, CBs, integrated devices combining one or more of the preceding devices, and the like.

Client 102 may be configured as a public system, such as a kiosk, a home computing device, a personal computing device, a personal mobile computing device, and the like, that are used by an employee, or the like, of an enterprise to access an enterprise resource, such as servers 108-110. In some environments, the client device is not issued or maintained by the enterprise, typically resulting in a classification as an untrusted device.

Servers 108-110 are computing devices that provide information and/or services to client 102. Servers 108-110 can, for example, store web pages or components thereof, dynamically create web pages or components thereof, store data and/or files for access by other servers or clients, or any combination of these functions.

In general, client 102 is a site where a human user operates the computing device to make requests for data or services from other computers on the network, though a client can be automated and not require a human user. Often, the requested data resides in computing devices such as servers 108-110. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

Intermediate network device 106 receives packets from network 104, and also receives packets from the servers 108-110. In some configurations, intermediate network device 106 acts like a layer 7 switch. That is, it may look at content associated with layers 5 through 7 of the packet, e.g. a request for an HTML page, the request including a Uniform Resource Locator (URL) and information that identifies the user, such as a cookie, etc. It can store information in memory so that the next time the requestor requests more information from the same web site each request is sent to the same server. An intermediate network device 106 can do this, in part, to ensure that the user is connected to the server that the user previously connected to. This helps prevent the loss of transaction data, such as items in an electronic shopping cart. A layer 7 switch may facilitate a communication between a client and a server by terminating a client-side TCP connection with the client, terminating a server-side TCP connection with the server, and using both connections to receive, process, and forward data between the client and the server.

In some configurations, intermediate network device 106 performs as a layer 4 switch. That is, it receives a packet, such as a TCP packet, from the client 102, minimally processes the packet, and forwards the packet to one of the servers 108-110 based on transport layer information. As a layer 4 switch, the intermediate network device does not terminate TCP connections with either the client or the server. Instead, a server, such as servers 108-110, performs a TCP handshake with client 102, and intermediate network device 106 forwards packets between the client and the server. As a layer 4 switch, the intermediate network device may make filtering and switching decisions based on layer 4 data within a packet, such as an IP address. It may also modify source or destination addresses on TCP packets prior to forwarding them, a process known as network address translation (NAT). The BIG-IP® family of traffic managers, by F5 Networks of Seattle, Wash., are examples of traffic managers that perform layer 4 switching or layer 7 switching. Intermediate network device 106 can operate, as a router, bridge, firewall, gateway, traffic management device (also referred to as a traffic manager), distributor, load balancer, server array controller, or proxy server. It is to be noted that these functions are not necessarily distinct from each other. For example, a traffic manager may perform load balancing and control an array of servers.

Figure 2:
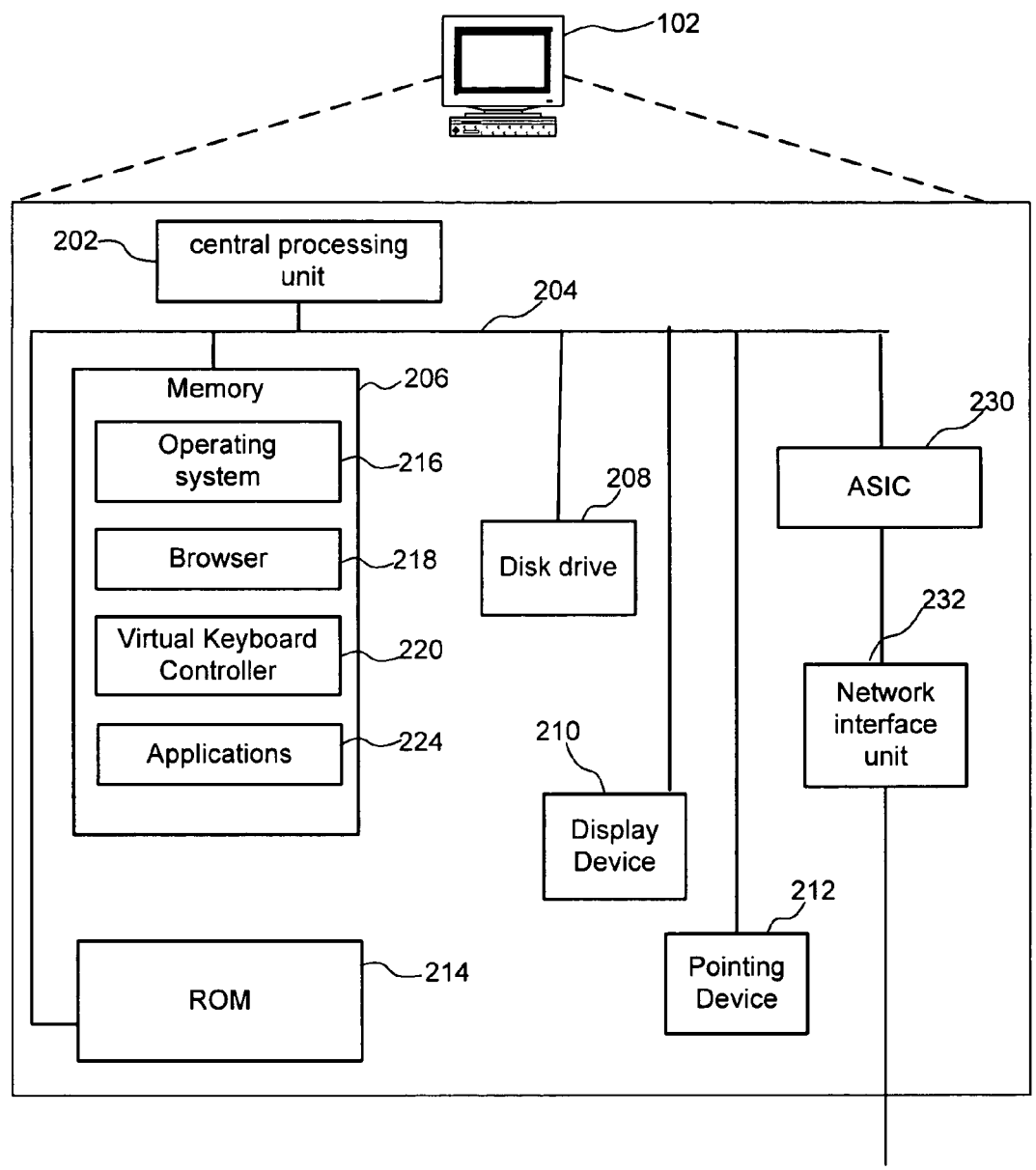
FIG. 2 is a block diagram of an exemplary network device that may be employed to perform the invention.

FIG. 2 shows an exemplary client 102 that can operate in accordance with the present invention. It will be appreciated that not all components of client 102 are illustrated, and that client 102 can include more or fewer components than those shown in FIG. 2.

As illustrated in FIG. 2, client 102 includes a central processing unit (CPU) 202, mass memory, and a network interface unit 232 connected via a bus 204. Network interface unit 212 includes the necessary circuitry for connecting client 102 to network 104, and is constructed for use with various communication protocols, including the TCP/IP protocol. Network interface unit 232 can include or interface with circuitry and components for transmitting messages and data over a wired and/or wireless communications medium.

The mass memory generally includes random access memory ("RAM") 206, read-only memory ("ROM") 214, and one or more permanent mass storage devices, such as hard disk drive 208. The mass memory stores operating system 216 for controlling the operation of client device 120. The operating system 216 may comprise an operating system such as UNIX®, LINUX®, or Windows®.

In one embodiment, the mass memory stores a browser module 218. Internet Explorer, by Microsoft Corporation, Netscape Browser, by Netscape Communications Corp., and the Opera Web Browser, by Opera Software, are examples of browser applications that could perform the functions of browser module 218. Client 102 can further include a virtual keyboard controller module 220, which is explained in further detail below. The virtual keyboard controller 220 can reside permanently in the client 102 or be transmitted to the client 102 when it is needed. In one embodiment, at least a portion of the virtual keyboard controller 220 is in the form of scripting code that is associated with an HTML page. JavaScript is one such scripting language. ActiveX is another type of code that can be used to implement all or parts of the virtual keyboard controller. A browser plug-in is yet another implementation. It is to be noted that the virtual keyboard controller can comprise one or more of these or other types of code or implementations. Client 102 can also include additional application modules 224.

As illustrated in FIG. 2, client 102 further includes a display device 210 for displaying visual information to a user. Display device 210 can be integrated with client 102 or separate from the client device. The display device can be a cathode ray tube monitor (CRT), an LCD monitor, a projection device, or other type of display device. The display device is employed to display all, or a portion of, a display area. In one embodiment, the display device displays a portion of the display area at any one time, and can be scrolled or otherwise moved to display different portions of the display area.

Client 102 further includes a pointing device 212 for allowing a user to input selected locations relative to a display area. The pointing device 212 can be integrated with client 102 or separate from the client device. A mouse, a joystick, a touch pad, an electronic pen, a touch screen, or other like devices can be used as the pointing device 212. In one embodiment, a keyboard is used as the pointing device 212. For example, cursor keys can be used to indicate a position on the display area, and a select key can be used to select the currently indicated position.

In one embodiment, the client 102 includes one or more Application Specific Integrated Circuit (ASIC) chips 230 connected to the bus 204. The ASIC chip 230 includes logic that performs some of the functions of client 102. A number of functions of the client device can be performed by the ASIC chip 230, by an FPGA, by the CPU 202 with the logic of program code stored in mass memory, or by any combination of the ASIC chip, the FPGA, and the CPU.

Computer storage media can include volatile and nonvolatile, removable and non-removable media implemented in any method or technology for storage of information, such as computer readable instructions, data structures, program modules or other data. Examples of computer storage media include RAM 206, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Figure 3A:
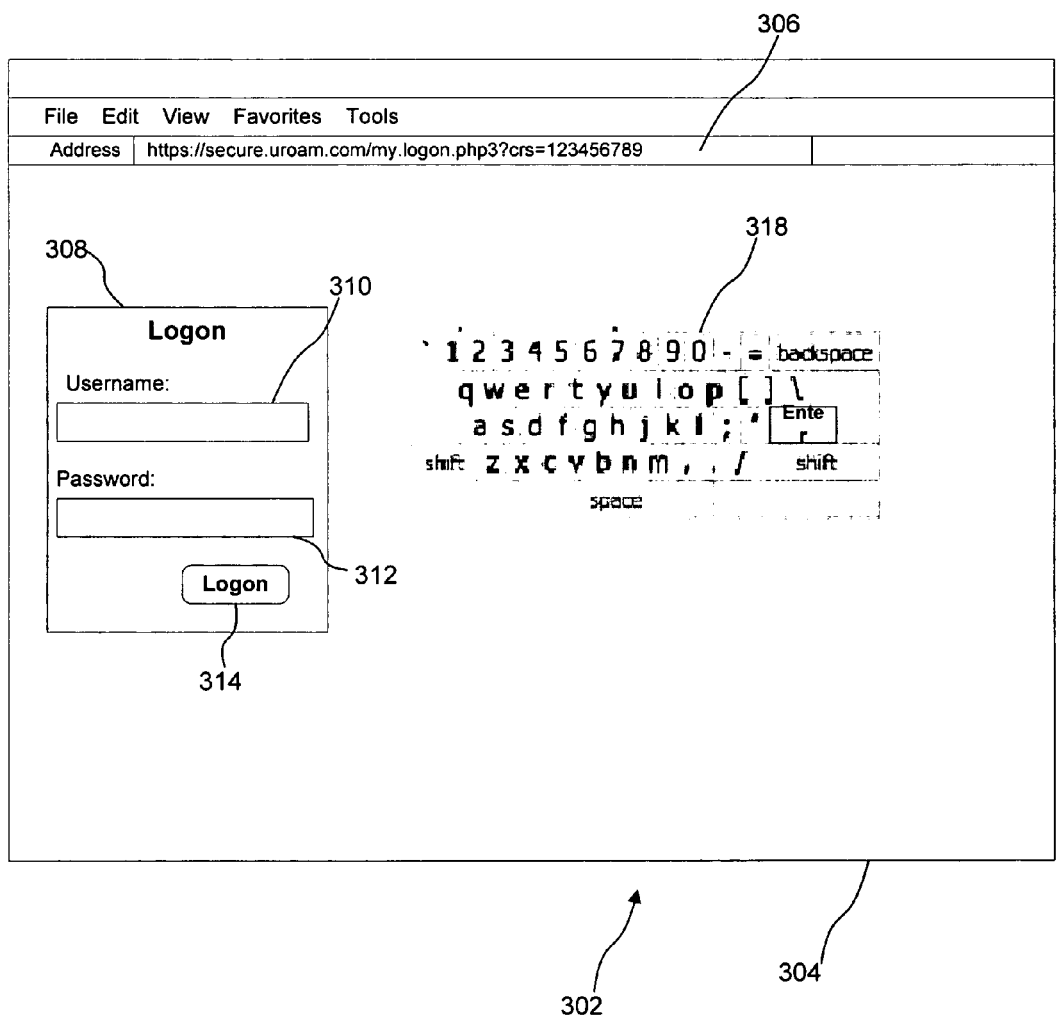
FIGS. 3A-C are pictorial diagrams illustrating an interface for employing the invention to enter data.

FIG. 3A illustrates an interface for employing the invention to enter data, in accordance with one embodiment of the invention. As illustrated in FIG. 3A, a display device, such as the display device 210 of FIG. 2, includes a physical display area 302, which displays all or a portion of a display area. To simplify this description, it is assumed that the physical display are displays the entire display area, though other configurations are possible within the invention.

A browser window 304 is shown in the display area 302. The browser window can be smaller than, the same size as, or larger than the display area. To simplify this description, the browser window 304 is shown as the same size as the display area. The browser window is shown as displaying a page received from a specific Web address 306, which is displayed within an address field of the browser window 304.

The browser window contains an exemplary logon window 308, which prompts a user to enter a username in a username field 310 and a password in a password field 312. A logon button 314 is employed by the user to indicate that a username and a password have been entered.

The browser window 304 further includes a keyboard image 318, which includes images of keys commonly included on a keyboard. As used herein, the term "key" refers to an image of a key, the context clearly dictates otherwise. Either all, or a portion of such keys can be included in the keyboard image 318. In one embodiment, keyboard keys that do not correspond to ASCII text, such as function keys and cursor keys, are omitted from the keyboard image 318. In various embodiments, various subsets of standard keyboard keys are included. The virtual keyboard controller 220, of FIG. 2, controls the display and use of the keyboard image 318, as discussed below.

When a user desires to enter data in the password field 312, the user employs the virtual keyboard controller 220. The virtual keyboard controller 220 causes the keyboard image 318 to be displayed. The virtual keyboard controller selects one or more random parameters, and displays the keyboard image based on these random parameters. Random parameters can control one or more attributes of the keyboard image display, such as size, position, shape, or angle of the image.

After the keyboard image 318 is displayed, the user selects one of the keys within the image, using the pointing device 212. For example, in one embodiment, the pointing device is used to control a pointer in the display area 302 to point to one of the keys, and then a select button is pressed to indicate that the key is selected. It is to be understood that different types of pointing devices work in a variety of ways for selecting an image on the display area. In one embodiment, after a key selection is made, an asterisk is displayed within the password field 312 to indicate that a key has been selected.

After a key has been selected, the virtual keyboard controller 220 selects one or more new random parameters for use in redisplaying the keyboard image 318. The existing image is removed from the display, and a new image of the keyboard is displayed using the new random parameters. A number of visual effects can be employed to indicate the transition, thereby presenting a visual image of the keyboard image 318 jumping to a new location, moving at different speeds, fading out and fading back in, and the like. In one embodiment, a position parameter varies, and other parameters remain the same. In one embodiment, each time the keyboard image changes, the selection of which parameters change may differ randomly or by a predetermined sequence.

Figure 3B:
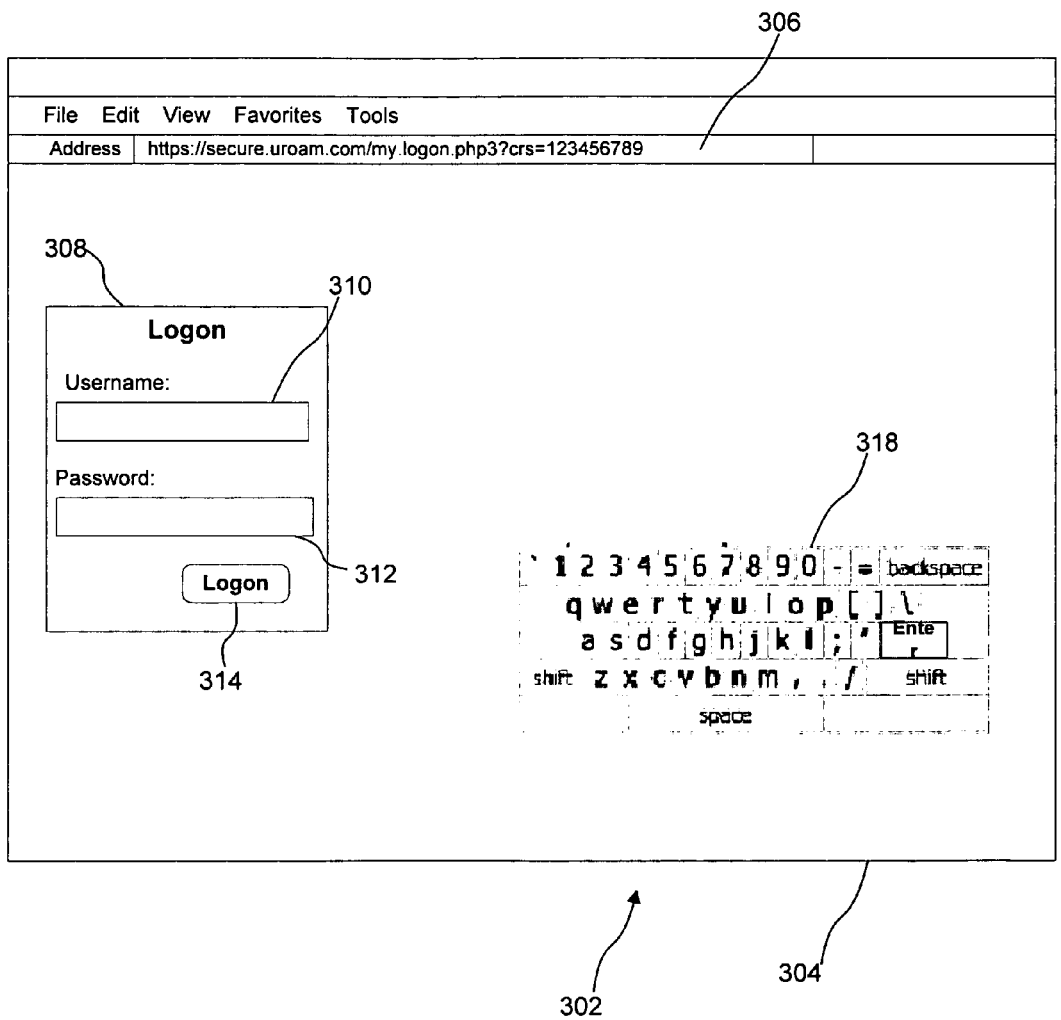

FIG. 3B illustrates a display similar to FIG. 3A, except that the keyboard image 318 has been changed to a different location. After the keyboard image has been changed, the user can make an additional key selection in a similar manner. In the exemplary change illustrated by FIGS. 3A and 3B, the screen coordinates corresponding to each key of the virtual keyboard image changes. For example, a user entering the same key as the first and second characters of the password will adjust the pointer device 212 to indicate different screen coordinates for each of the two selections, even though the selected key is the same. Similarly, a user may employ the pointing device to select the same screen coordinates for both selections, but they will correspond to different keys for respective selections.

In some embodiments, a subset, rather than all of the keys of the virtual key image may change corresponding screen coordinates. For example, display parameters may change such that the position parameter remains the same while the size parameter and the angle parameter changes, causing some screen coordinates to correspond to the same keys in both displays, while other screen coordinates correspond to different keys. In some embodiments, all screen coordinates change. If the position parameter changes a small amount, the keys of the first virtual keyboard image may have overlapping screen coordinates with the keys of the second virtual keyboard image. In one embodiment, the virtual keyboard controller employs an algorithm for changing the displays such that each change results in no overlap with keys and corresponding screen coordinates from the previous display.

Figure 3C:
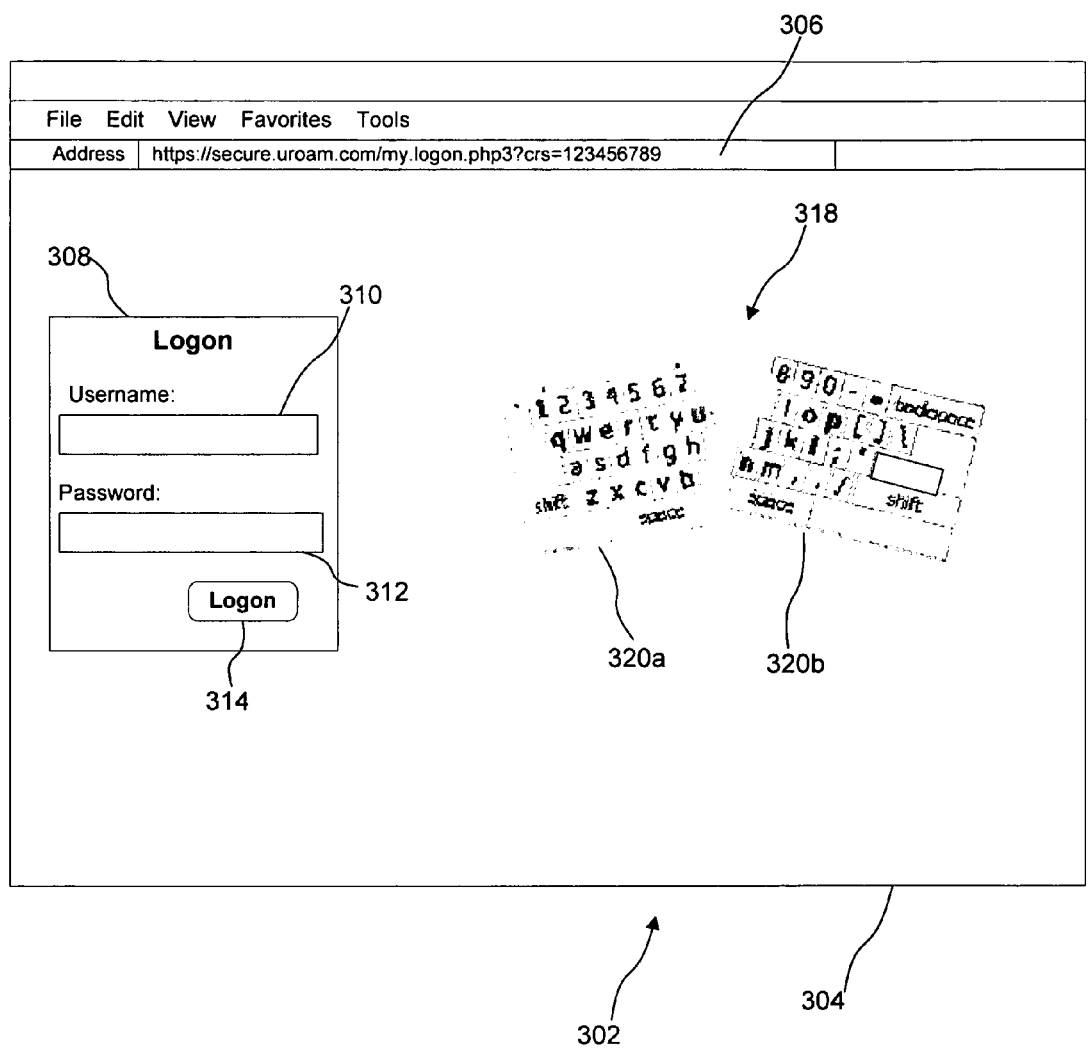

In one embodiment, additional parameters are employed to further control image changes by dividing the keyboard image into two or more sub-images. The sub-images can be displayed spaced apart, at different positions, having different angles, shapes, and the like. FIG. 3C illustrates another display showing the keyboard image 318 divided into two sections, section 320a and 320b, having different parameters for display. This can be implemented, for example, by having a set of display parameters controller section 320a and a second set of parameters controlling section 320b. In one embodiment, the display parameters are controlled to present an easily usable interface. For example, the right portion of the keyboard is positioned to be at least close to, and on the right side of, the left portion of the keyboard. Also, unusual positions such as an upside-down keyboard image can be avoided. In one implementation, a set of display parameters controls the position of the first section, section 320a, and additional parameters control one or more of attributes for the section, section 320b, such as horizontal and vertical distance and angle from the first section. Additional parameters could also control the number of sections in which the keyboard image 318 is divided, and the location of the divisions.

Figure 4:
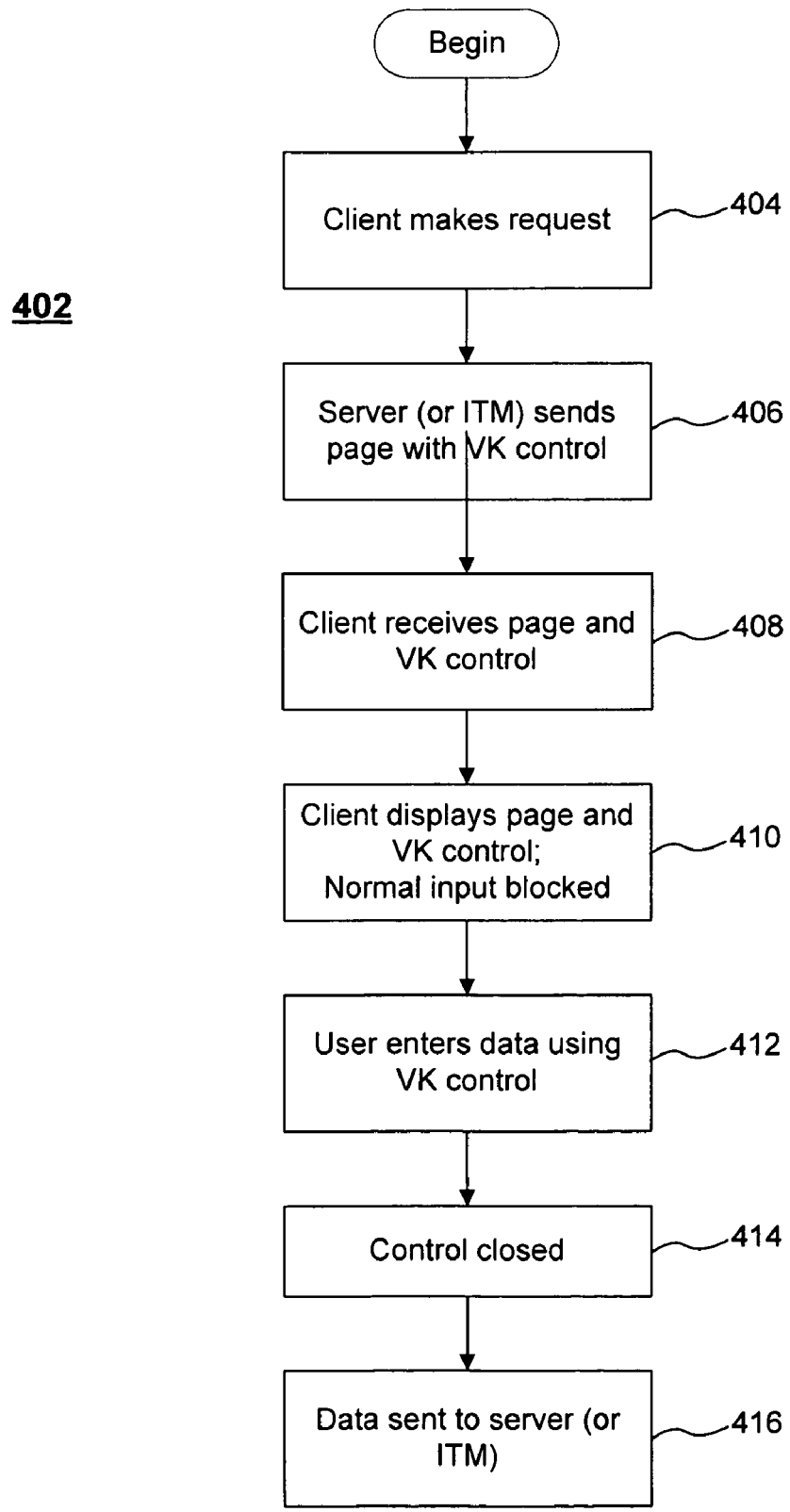
FIG. 4 is a flow chart illustrating a process of receiving and sending data to a server, in accordance with an embodiment of the present invention.

FIG. 4 illustrates a process 402 of receiving and sending data to a server, in accordance with an embodiment of the present invention. Process 402 begins after a begin block, at a block 404, where a client, such as client 102, makes a request. Typically, the request is an HTTP request for data from or access to a resource, such as a resource provided by one or more of servers 108-110, or intermediate network device 106, of FIG. 1. The request can be a request for access to a LAN, or to establish a VPN. The request can be one of a protocol other than HTTP, however.

At a block 406, a network device, such as one of the servers 108-110 or the intermediate network device 106 of FIG. 1 responds to the client request by sending a virtual key control, along with a page to display, such as an HTML page. At a block 408, the requesting client receives the virtual key control and the corresponding page. At a block 410, the client displays the page and the virtual keyboard controller displays the virtual keyboard image. The virtual keyboard may be displayed at the time that the page is displayed. Alternatively, the virtual keyboard may be displayed in response to the user initiating an action indicating a desire to enter information into a sensitive field. In the example of FIG. 3A, the password field is considered to be the sensitive field. In one embodiment, the virtual keyboard is displayed in response to the sensitive field receiving the focus. A field receives the focus in response to one of a number of actions, such as the user clicking within the field or positioning a cursor in the field by using a tab key on a keyboard. Change of focus may be controlled by HTML code, script associated with the displayed page, browser or browser plug-in instructions, and the like.

In one embodiment, the virtual keyboard controller blocks some or all of normal input mechanisms when the virtual keyboard image is displayed. For example, keys on the physical keyboard that correspond to keys on the virtual keyboard image may be blocked, to prevent the user from using these physical keys. Some keys on the physical keyboard may be left unblocked. For example, the tab key and the enter key may be left active during the time that the virtual keyboard image is displayed. Other keys that do not correspond to characters that are allowed to make up the sensitive field data may also be left active. In one embodiment, an audible signal is provided in response to a user attempting to use one of the blocked keys, in order to indicate that the keys are not functional.

Figure 5:
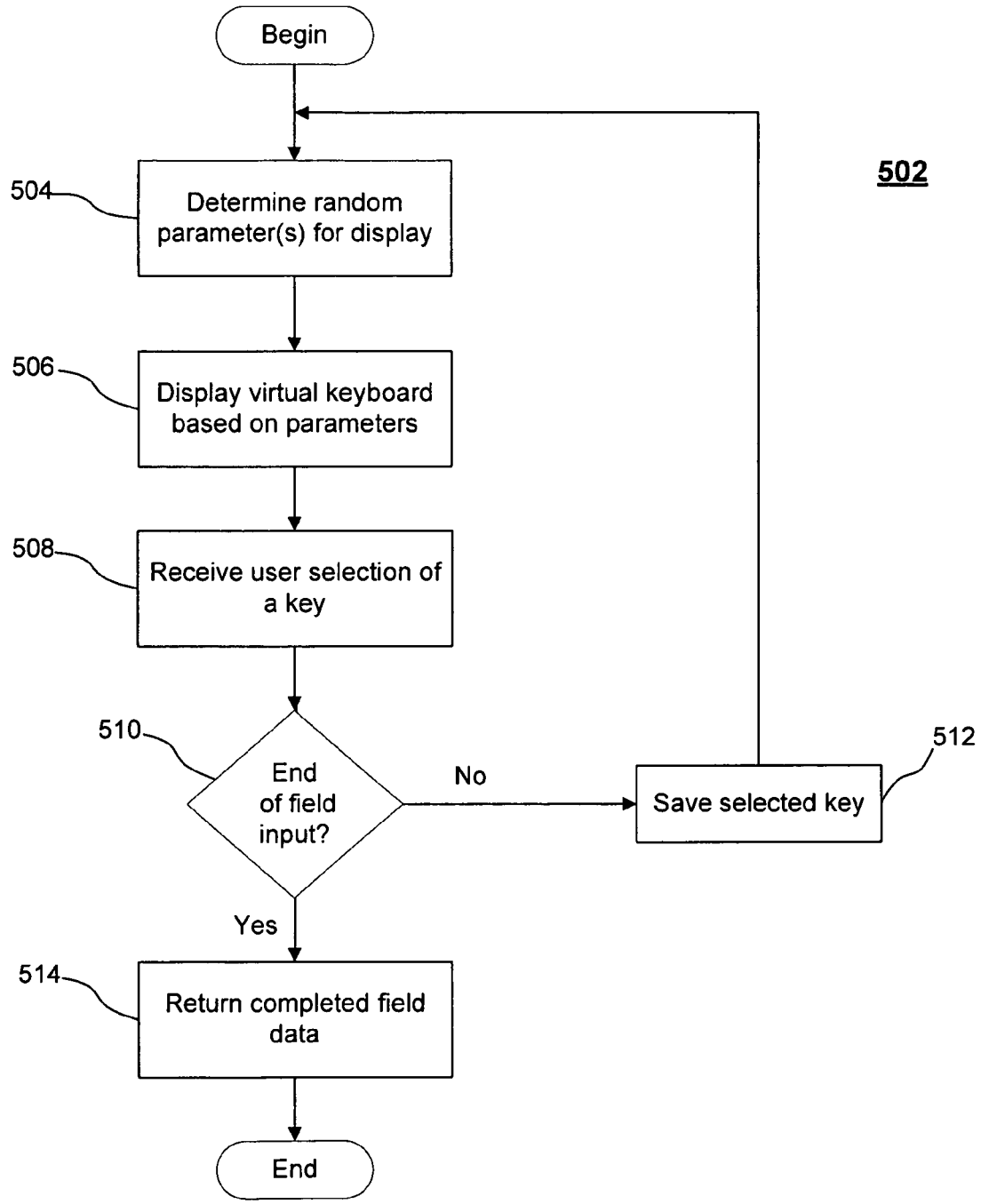
FIG. 5 is a flow chart illustrating a process of receiving user input, in accordance with an embodiment of the present invention.

At a block 412, the user enters data for the sensitive field by using the virtual keyboard controller. Further details of the actions in blocks 410 and 412 are illustrated in FIG. 5 and discussed below. When the user is finished entering data for the sensitive field, at a block 414, the virtual keyboard controller closes the virtual keyboard by removing it from the screen. The user may actively signal that the input for the field is complete in one of several ways. Selecting the ENTER key on either the physical keyboard or the virtual keyboard image can be used as a signal. Selecting the TAB key on either the physical keyboard or the virtual keyboard image is another way. Other keys, such as cursor keys, can also be employed as the signal of completion. In one embodiment, if input is not received for a predetermined amount of time, the virtual keyboard controller may close the virtual keyboard for security reasons. When this happens, one option is to delete the characters already entered in the sensitive field.

At a block 416, data entered into the sensitive field is sent to the server, intermediate network device, or other device that is to receive the data. Sending the data may be done using standard mechanisms, such as HTTP, SSL, or other forms of encryption or other protocols.

FIG. 5 illustrates a process 502 of receiving user input, in accordance with an embodiment of the invention. FIG. 5 illustrates in further detail, the actions of boxes 410 and 412 of FIG. 4.

Process 502 begins after a begin block, at a block 504, where the virtual keyboard controller determines one or more random parameters for controlling the display of the virtual keyboard image 318 (FIGS. 3A-C). As discussed above, these parameters could control the position of the keyboard image on the display, the size, angle, or shape of the image, whether the image is divided into two or more sub-images, and parameters for sub-images. A number of algorithms for producing random numbers are available for determining random parameters. Generally, these algorithms produce numbers that are commonly called pseudo-random numbers, because they are not mathematically perfectly random. For purposes of this invention, the term random includes pseudo-random, and values that are difficult to predict or to reverse engineer.

At a block 506, the virtual keyboard controller displays the virtual keyboard image 318 based on the determined parameters. FIGS. 3A-C illustrate three displays resulting from respectively different determined parameters.

At a block 508, the virtual keyboard controller receives a user selection of a key. Generally, this action includes receiving a specification of a position on the display area 302 or the browser window 304, and translating the position into a corresponding key displayed at the position. As discussed above, the selection of a key can also be made by using the physical keyboard, for a limited set of keys.

At a decision block 510, a determination is made of whether the end of the input for the field has been reached, as indicated by selection of an enter key or one of several other mechanisms, as discussed above. If the end has not been reached, flow proceeds to a block 512, where the selected key is saved. This can include saving the selected key in a field buffer. An asterisk or other symbol may also be displayed within the field, such as the username field 310 of FIGS. 3A-C. In one embodiment, the actual selected key is displayed in the field. In one embodiment, audio feedback is provided instead of, or in addition to, visual feedback, to indicate that a key has been properly selected. Flow then proceeds back to the block 504, to repeat the process of randomizing parameters and displaying the virtual keyboard image.

Although FIG. 5 shows a process 502 whereby the virtual keyboard image is randomly redisplayed after each key selection, the invention is not so limited. The random display may, for example, occur only the first time the virtual keyboard image is displayed for an instance of entry in a field, and remain the same for each key input until the field is completed. The random display may also occur after every second, every third, or another number of keys. The random display may further occur based on a time since the image is first displayed for an instance of a field entry, or a combination of time and a key entry.

If, at the decision block 510, it is determined that the end of the field input has been reached, flow proceeds to the block 514, where the completed input field is returned, for sending to the recipient, as described above.

An aspect of the invention includes mechanisms for injecting a virtual key controller into the input process for target sensitive input fields. In one embodiment, a virtual key controller is included by a server with an HTML page, and associated with one or more sensitive input fields on the page. As used herein, a sensitive input field refers to an input field where it is desirable to maintain a heightened level of confidentiality. A password is one example of a sensitive input field. In various embodiments of the invention or in various configurations, fields for entering user names, financial account numbers, social security numbers and the like may be considered to be sensitive input fields. As discussed above, the controller can be in the form of one or more JavaScript functions, an ActiveX control, or another such mechanism.

Figure 6:
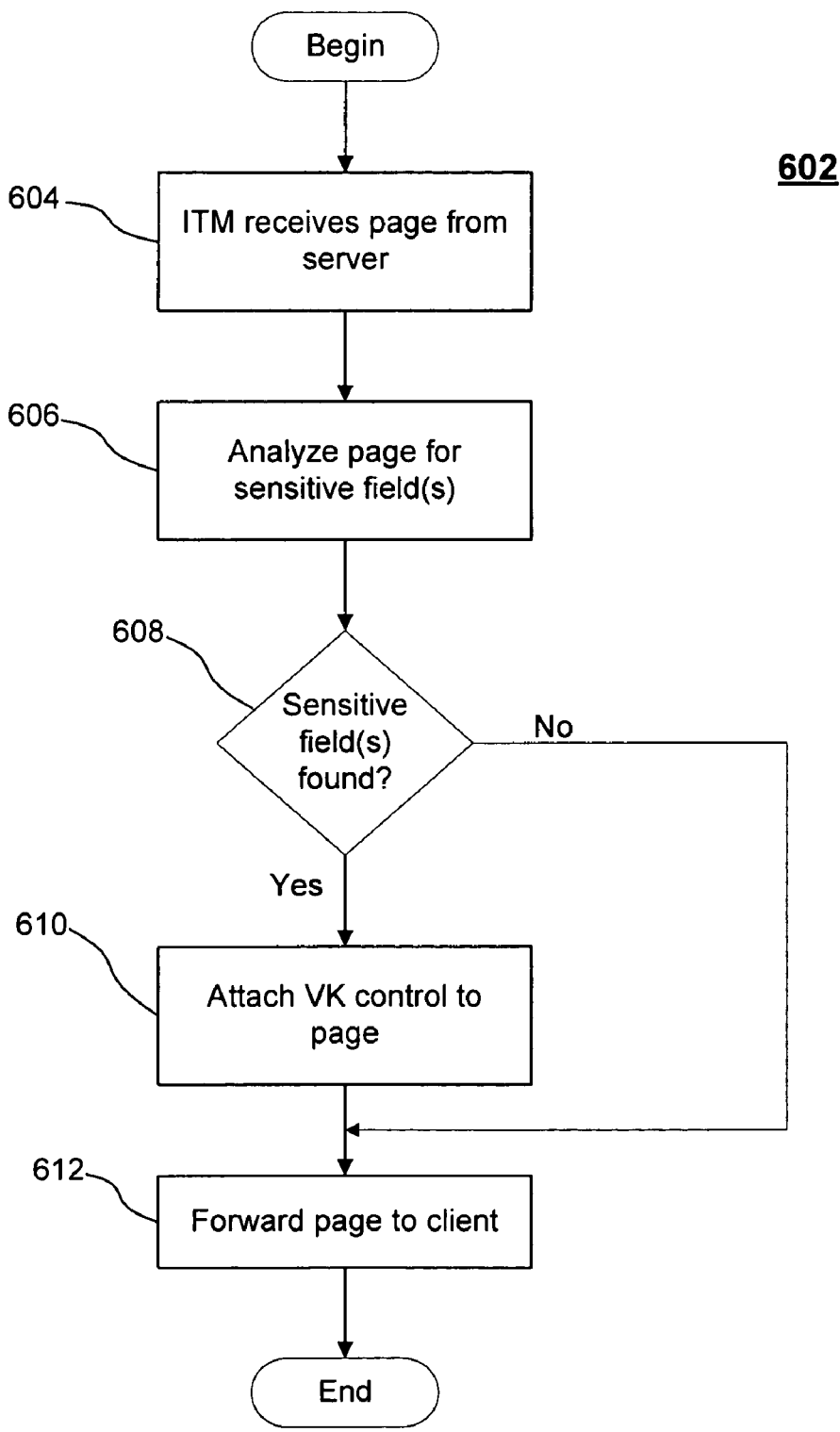
FIG. 6 is a flow chart illustrating a process for preparing an interface for receiving user input, in accordance with an embodiment of the present invention.

FIG. 6 illustrates a process 602 of automatically analyzing a page and associating a virtual key controller with one or more sensitive fields on the page. Process 602 begins after a begin block, at a block 604, where an intermediate device, such as intermediate network device 106 of FIG. 1, receives a page, such as an HTML page, from a server. At a block 606, the intermediate network device analyzes the page for the existence of one or more sensitive fields. This can be done, for example, by scanning or parsing the HTML for an input field specifying the type as "password," which specifies that the input text is to be replaced with asterisks instead of echoing the actual text on a display. Other keywords or flags for indicating sensitive fields can also be used and searched for by the intermediate network device. In one embodiment, a default of low sensitivity is assumed for each input field not having a recognizable indication of sensitivity level. In one embodiment, a list of keywords or phrases is used to indicate higher sensitivity levels. For example, if the list includes the phrase "credit card" and this phrase is found on a page near a text input field, it might be assumed that the associated text input field is a sensitive input field.

At a decision block 608, a determination is made as to whether one or more sensitive fields have been found. If such a field has been found, flow proceeds to a block 610, where the virtual keyboard controller of the present invention is associated with the page, and the page is modified to use this controller for input of the sensitive field. In one embodiment, associating the virtual keyboard controller with the page includes inserting the virtual keyboard controller into the stream of data that includes the page. In one embodiment, the client may have the virtual keyboard controller or receive it in another manner. Flow then proceeds to a block 612.

If, at the decision block 608, a determination is made that a sensitive field has not been found, flow proceeds around block 610 to the block 612. At the block 612, the page received by the intermediate network device, along with any modifications and additions, is forwarded to the client device.

In one embodiment, the actions of blocks 606, 608, and 610, of analyzing a page for sensitive fields and selectively attaching a virtual keyboard control based on the analysis, are themselves selectively done, based on attributes of the client device. A client device that is likely to be more subject to security concerns may be subject to the actions of FIG. 6 than a client that is of less concern. For example, a client that is a public kiosk or other publicly shared computer may have an increased likelihood of security problems. Therefore, the process 602 may include an analysis of the client device. If the client device is of a type subject to higher security concerns, such as a publicly used device, the actions of process 602 are performed. If not, pages may be received and forwarded without the additional actions described above.

In one embodiment, the actions of blocks 606, 608, and 610 are performed by a process on the same device as the server providing the page, rather than an intermediate network device.

Figure 7:
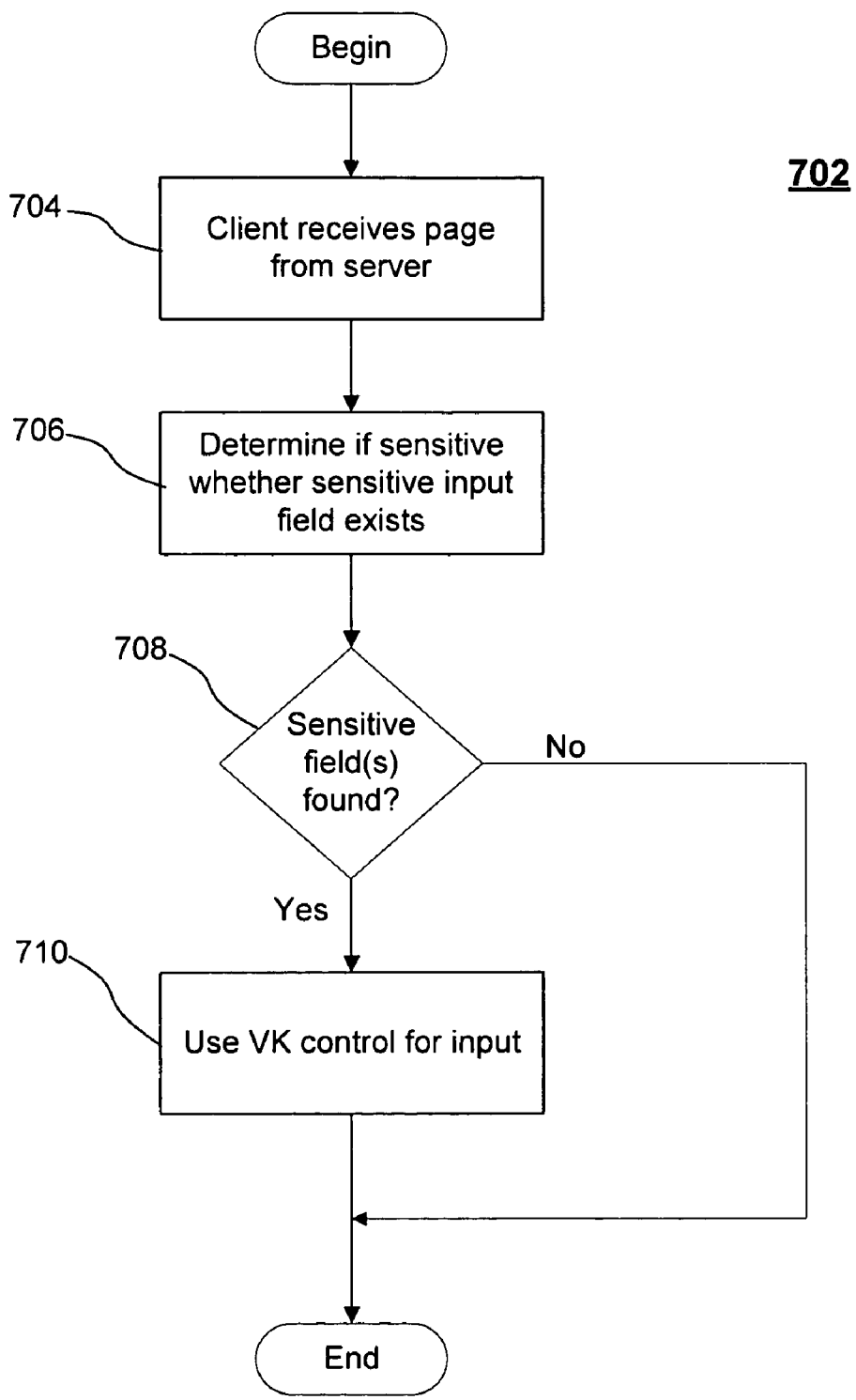
FIG. 7 is a flow chart illustrating another process for preparing an interface for receiving user input, in accordance with an embodiment of the present invention.

FIG. 7 shows a process 702 of a client device analyzing pages and injecting a virtual keyboard controller as desired. After a begin block, at a block 704, the client receives a page from a server. At a block 706, the client device determines whether a sensitive input field exists. At a decision block 708, if a sensitive input field is found, flow proceeds to a block 710, where a virtual keyboard control is used for input to the sensitive field. If, at the decision block 708, a sensitive input field has not been found, flow proceeds around the block 710, to the end of process 702.

In one embodiment, the process 702 is selectively done based on a security configuration of the client device. If the configuration is set to a high level, the process is performed. If the configuration is set to a lower level, the process is not performed. In one embodiment, a user can enter a command invoking the process 702.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method for receiving user input of text data comprising:
    (a) displaying on a computer display device a first image of a keyboard based on a first set of at least one display parameter, the first image including a first plurality of keys representing a set of text characters;
    (b) receiving a first user selection of one of the first plurality of keys, the first user selection corresponding to a text character of the set of text characters;
    (c) in response to receiving the first user selection, replacing the display of the first image of the keyboard with a display on the computer display device of a second image of the keyboard based on a second set of at least one display parameter that controls the display of the second image, the second set being different from the first set and determined after the receipt of the first user selection, and the second image including a second plurality of keys representing the set of text characters, wherein the first set and the second set are determined to enable a different image of the keyboard to be displayed for each key selected by a user;
    (d) receiving a second user selection of one of the second plurality of keys, the second user selection corresponding to another text character of the set of text characters; and
    (e) combining the text character of the first user selection with the other text character of the second user selection to generate at least a portion of a text string within a same transaction, wherein the text string is subsequently sent to another computing device to perform an action.

2. The method of claim 1, wherein the first set of at least one display parameter indicates a first position to display the first image, the second set of at least one display parameter indicates a second position to display the second image, and wherein the second position is different from the first position such that a screen coordinate corresponding to at least one virtual key in the first image is changed for the same virtual key in the second image at the second position.

3. The method of claim 1, wherein the first set of at least one display parameter indicates a first angle to display the first image, the second set of at least one display parameter indicates a second angle to display the second image, and wherein the second angle is different from the first angle.

4. The method of claim 1, wherein the first set of at least one display parameter indicates a first shape to display the first image, the second set of at least one display parameter indicates a second shape to display the second image, and wherein the second shape is different from the first shape.

5. The method of claim 1, further comprising blocking text input corresponding to a plurality of text keys from a physical keyboard.

6. The method of claim 1, further comprising blocking text input corresponding to at least a majority of text keys from a physical keyboard.

7. The method of claim 1, further comprising blocking text input corresponding to at least a majority of text keys from a physical keyboard and permitting at least one key from the set consisting of an enter key, a tab key, and a cursor key from the physical keyboard to remain active.

8. The method of claim 1, further comprising determining at least a portion of the second set of at least one display parameter based on one or more random values, wherein each of the random values is generated in response to each individual key selection of the keyboard.

9. The method of claim 1, further comprising, in response to receiving the second user selection and a plurality of additional user selections, displaying additional images of the keyboard based on additional sets of at least one display parameter, each additional image corresponding to a user selection.

10. The method of claim 1, further comprising analyzing a page to determine at least one sensitive text input field for applying the actions (a) through (e), based on a desired level of security associated with each text input field contained within a markup language page.

11. The method of claim 1, further comprising analyzing a page to determine at least one sensitive text input field for applying the actions (a) through (e), wherein the at least one sensitive text input field is a password entry field, or an account number field.

12. The method of claim 1, further comprising detecting that a sensitive input field has received an input focus, and wherein the displaying the first image of the keyboard is performed in response to said detecting.

13. The method of claim 1, wherein each of the first image and the second image presents a view of a keyboard divided into two or more spaced apart sections.

14. The method of claim 13, wherein the two or more spaced apart sections of the second image are spaced differently than the two or more spaced apart sections of the first image.

15. A data entry system comprising a virtual keyboard controller arranged to perform actions, including:
(a) displaying on a display of the data entry system a first keyboard image at a first location, the first keyboard image comprising a plurality of keys;
(b) receiving a first user selection of a key from the plurality of keys, the first user selection corresponding to a text character of a set of text characters;
(c) in response to receiving the first user selection, replacing the first keyboard image with a display of a second keyboard image at a second location determined after the receipt of the first user selection, wherein a screen coordinate corresponding to a same key in the first keyboard image and the second keyboard image is changed, the second keyboard image comprising the plurality of keys, wherein the first and second locations are determined to enable a different image of the keyboard to be displayed for each key selected by a user;
(d) receiving a second user selection of a second key from the plurality of keys of the second keyboard image, the second user selection corresponding to another text character of the set of text characters; and
(e) combining the text character of the first user selection and the other text character of the second user selection to form a text input string that is subsequently employed to enable a computing device to perform an action.

16. The data entry system of claim 15, the virtual keyboard controller further arranged to perform further actions, including blocking at least a portion of text input from a physical keyboard.

17. The data entry system of claim 15, the virtual keyboard controller further arranged to perform further actions, including determining the second location based on a random value.

18. The data entry system of claim 15, wherein said virtual keyboard controller actions are performed in response to a user selection of a sensitive input field.

19. The data entry system of claim 15, wherein the first keyboard image is displayed at a first angle, the second keyboard image is displayed at a second angle, and the first angle is different from the second angle.

20. A method for receiving user input, comprising:
(a) receiving a page for display to a user on a computing display device, the page including a text input field;
(b) determining whether the text input field is a sensitive input field;
(c) if the text input field is a sensitive input field:
(i) displaying a first keyboard image on the computing display device based on a first set of at least one parameter;
(ii) receiving a first user input of a key selection within the first keyboard image, the first user input corresponding to a text character of a set of text characters;
(iii) in response to receiving the first user input of the key selection, replacing at least a portion of the first keyboard image with a display of a second keyboard image based on a second set of at least one parameter, wherein the second set controls the display of the second keyboard image, wherein the first set and the second set are determined to enable a different image of the keyboard to be displayed for each key selected by the user;
(iv) receiving a second user input of a second key selection within the second keyboard image, the second user input corresponding to another text character of the set of text characters; and
(v) combining the text character of the first key and the other text character of the second key to form a text input string useable to enable the user to perform at least one secured interaction with at least one computing device.

21. The method of claim 20, further comprising if the text input field is not a sensitive input field, using a physical keyboard to receive user input of a text string as input to the text input field.

22. The method of claim 20, further comprising displaying the second keyboard image at least one of a different location or a different angle than the first keyboard image.

23. An intermediate network device (IND) arranged to perform IND actions, including:
(a) receiving data from a server;
(b) determining whether the data includes a sensitive input field; and
(c) if the data includes the sensitive input field, associating a virtual keyboard controller with the sensitive input field, the virtual keyboard controller comprising instructions to perform controller actions, including:
(i) displaying on a computer display device a first keyboard image based on a first set of at least one parameter;

(ii) receiving a first user input of one or more key selections within the first keyboard image, the first user input corresponding to at least one text character of a set of text characters;

(iii) in response to receiving the first user input of the key selection, replacing at least a portion of the first keyboard image with a display of a second keyboard image based on a second set of at least one parameter, wherein the second set is determined after the receipt of the first user input, wherein the first set and the second set are determined to enable a different image of the keyboard to be displayed for each key selected by a user;

(iv) receiving a second user input of a second one or more key selections within the second keyboard image, the second user input corresponding to at least one other text character of a set of text characters; and (v) combining the text character of the first key selections and the other text character of the second key selections to form a text input string that is useable to enable a secure computer interaction to be performed based on the sensitive input field.

24. The intermediate network device of claim 23, the IND actions further including forwarding the page and the virtual keyboard controller to a client device.

25. The intermediate network device of claim 23, further comprising forwarding the data to a client, and wherein determining whether the data includes a sensitive input field is at least partly based on attributes of the client.

26. The intermediate network device of claim 23, further comprising:

(a) forwarding the data to a client; and (b) if the data includes the sensitive input field, sending the virtual keyboard controller to the client.

27. A virtual keyboard controller comprising:

(a) means for displaying a virtual keyboard in a first random position on a computer device, the virtual keyboard having a plurality of keys;

(b) means for receiving a first user selection of a key of the virtual keyboard, the first user selection corresponding to a text character of a set of text characters;

(c) means for, in response to receiving the first user selection, causing the virtual keyboard to be redisplayed in a second random position on the computer device, the second random position determined after the receipt of the first user selection, wherein a screen coordinate for at least one key in the first random position is changed in the second random position for the corresponding same key, and wherein the first random position and the second random position are determined to enable a different image of the virtual keyboard to be displayed for each key selected by a user; and (d) means for, after redisplaying the virtual keyboard, receiving a second user selection of a key of the virtual keyboard, the second user selection corresponding to another text character of the set of text characters; and (e) means for combining the text character of the first user selection with the other text character of the second user selection to generate a text string useable to enable a computer device to perform a transaction.

* * * * *

UNITED STATES PATENT AND TRADEMARK OFFICE
CERTIFICATE OF CORRECTION

PATENT NO. : 7,705,829 B1  Page 1 of 1
APPLICATION NO. : 11/063767
DATED : April 27, 2010
INVENTOR(S) : Igor Plotnikov It is certified that error appears in the above-identified patent and that said Letters Patent is hereby corrected as shown below:

In column 6, line 54, delete "controller" and insert -- controlling --, therefor.

Signed and Sealed this
Twenty-second Day of February, 2011

David J. Kappos
*Director of the United States Patent and Trademark Office*